United States Patent
Hwang et al.

(10) Patent No.: US 9,577,812 B2
(45) Date of Patent: Feb. 21, 2017

(54) METHOD AND APPARATUS FOR AGGREGATING PLURALITY OF CELLS

(71) Applicant: LG Electronics Inc., Seoul (KR)

(72) Inventors: Daesung Hwang, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 14/435,510

(22) PCT Filed: Sep. 25, 2013

(86) PCT No.: PCT/KR2013/008561
§ 371 (c)(1),
(2) Date: Apr. 14, 2015

(87) PCT Pub. No.: WO2014/069790
PCT Pub. Date: May 8, 2014

(65) Prior Publication Data
US 2015/0304092 A1 Oct. 22, 2015

Related U.S. Application Data

(60) Provisional application No. 61/719,493, filed on Oct. 29, 2012.

(51) Int. Cl.
*H04J 3/00* (2006.01)
*H04L 5/00* (2006.01)
(Continued)

(52) U.S. Cl.
CPC .......... *H04L 5/0098* (2013.01); *H04L 1/1864* (2013.01); *H04L 5/14* (2013.01); *H04W 72/0413* (2013.01);
(Continued)

(58) Field of Classification Search
USPC .......... 370/280, 328, 336, 338, 345
See application file for complete search history.

(56) References Cited

U.S. PATENT DOCUMENTS

2012/0213170 A1* 8/2012 Choi .................. H04L 1/1861
370/329
2013/0223295 A1* 8/2013 Choi .................. H04L 1/18
370/280
(Continued)

FOREIGN PATENT DOCUMENTS

WO 2012/108718 A2 8/2012

OTHER PUBLICATIONS

Samsung, "Discussion on the maximum number of aggregated cells", R1-122219, 3GPP TSG RAN WG1 Meeting #69, Prague, Czech Republic, May 21-25, 2012.
(Continued)

*Primary Examiner* — Ricky Ngo
*Assistant Examiner* — Christine Ng
(74) *Attorney, Agent, or Firm* — Dentons US LLP

(57) ABSTRACT

According to one embodiment of the present invention, there is provided a method for aggregating a plurality of cells. According to the method, a first cell may determine whether to add one or a plurality of second cells for user equipment. Here, a maximum number of cells are determined depending on a number of cells that belong to the first cell and the one or the plurality of second cells and whose reference configuration has been set as a specific Time Division Duplex (TDD) UL-DL configuration and a number of cells that have been actually set as the specific TDD UL-DL configuration. Also, the first cell may transmit a configuration for adding one or a plurality of second cells to the user equipment based on the determined maximum number of cells.

13 Claims, 15 Drawing Sheets

(51) Int. Cl.
*H04L 1/18* (2006.01)
*H04W 72/04* (2009.01)
*H04L 5/14* (2006.01)

(52) U.S. Cl.
CPC .......... *H04W 72/0446* (2013.01); *H04L 5/001* (2013.01); *H04L 5/0053* (2013.01); *H04L 5/0055* (2013.01); *H04L 5/1469* (2013.01)

(56) References Cited

U.S. PATENT DOCUMENTS

| | | | |
|---|---|---|---|
| 2013/0242815 A1* | 9/2013 | Wang | H04L 1/1854 370/280 |
| 2014/0092824 A1* | 4/2014 | He | H04W 52/0258 370/329 |

OTHER PUBLICATIONS

Nokia Siemens Networks, "Measurement Configuration in Carrier Aggregation", R2-101524, 3GPP TSG-RAN WG2 Meeting #69, San Francisco, USA, Feb. 22-26, 2010.
Huawei et al., "Scheduling timing design for TDD inter-band CA with different UL-DL configurations", R2-120061, 3GPP TSG-RAN WG2 Meeting #77, Dresden, Germany, Feb. 6-10, 2012.
Itri, "Maximum number of DL HARQ processes for TDD inter-band CA with different TDD UL-DL configurations", R1-124478, 3GPP TSG RAN WG1 Meeting #70bis, San Diego, USA, Oct. 8-12, 2012.

* cited by examiner

METHOD AND APPARATUS FOR AGGREGATING PLURALITY OF CELLS

This Application is a 35 U.S.C. §371 National Stage entry of International Application No. PCT/KR2013/008561, filed Sep. 25, 2013, which claims benefit of Provisional Application No. 61/719,493 filed Oct. 29, 2012, both of which are incorporated by reference in their entirety herein.

BACKGROUND OF THE INVENTION

Field of the Invention

The present invention relates to wireless communication and, more particularly, to a method and apparatus for aggregating a plurality of cells in a wireless communication system.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels are used in transmission of various uplink control information such as a hybrid automatic repeat request (HARQ) ACK/NACK, channel state information (CSI), and a scheduling request (SR).

Radio resources for the uplink channels are more limited than radio resources for the downlink channels.

SUMMARY OF THE INVENTION

A disclosure of this specification has an object to smoothly send an uplink signal through an uplink channel by limiting a maximum number of aggregatable cells because radio resources for an uplink channel are more limited than radio resources for a downlink channel when a plurality of cells is aggregated.

In order to achieve the above object, in accordance with an aspect of the present invention, there is provided a method for aggregating a plurality of cells. The method may comprise: determining, by a first cell, whether or not to add one or a plurality of second cells for user equipment. Here, a maximum number of cells are determined depending on a number of cells that belong to the first cell and the one or the plurality of second cells and whose reference configuration has been set as a specific Time Division Duplex (TDD) UL-DL configuration and a number of cells that have been actually set as the specific TDD UL-DL configuration. The method may comprise: transmitting, by the first cell, a configuration for adding one or a plurality of second cells to the user equipment based on the determined maximum number of cells; and transmitting, by the first cell, a signal for activating the one or the plurality of second cells to the user equipment. Here, both the first cell and the second cells operate in TDD or the first cell and the second cells independently operate in TDD and Frequency Division Duplex (FDD).

In the specific TDD UL-DL configuration, a number of downlink subframes may be a maximum and a number of uplink subframes may be a minimum within a radio frame. That is, the specific TDD UL-DL configuration may be an UL-DL configuration 5 defined in 3GPP LTE or LTE-A.

If the user equipment may be configured as a PUCCH format 3, the determined maximum number of cells may be aggregated.

If a total number of HARQ ACK-NACK to be transmitted to the first cell and the added one or plurality of second cells may be 20 bits or 21 bits or less, the one or the plurality of second cells may be determined to be added.

If a total number of HARQ ACK-NACK may be 20 bits or 21 bits or less after spatial bundling may be applied to HARQ ACK-NACK to be transmitted to the first cell and the added one or plurality of second cells, the one or the plurality of second cells may be determined to be added.

In order to achieve the above object, in accordance with an aspect of the present invention, there is provided a base station for providing a first cell for user equipment which may comprise: a processor configured to determine whether or not to add one or a plurality of second cells for the user equipment. Here, a maximum number of cells are determined depending on a number of cells that belong to the first cell and the one or the plurality of second cells and whose reference configuration has been set as a specific Time Division Duplex (TDD) UL-DL configuration and a number of cells that have been actually set as the specific TDD UL-DL configuration. The base station may comprise: a transmission/reception unit configured to transit a configuration for adding one or a plurality of second cells to the user equipment based on the determined maximum number of cells and transmit a signal for activating the one or the plurality of second cells to the user equipment. Here, both the first cell and the second cells operate in TDD or the first cell and the second cells independently operate in TDD and Frequency Division Duplex (FDD).

In order to achieve the above object, in accordance with an aspect of the present invention, there is provided a method for supporting an aggregation of a plurality of cells in user equipment. The method may comprise: receiving a configuration for adding one or a plurality of second cells from a first cell. Here, the one second cell or a number of the plurality of second cells may be determined depending on a number of cells that belong to the first cell and the one or the plurality of second cells and whose reference configuration has been set as a specific Time Division Duplex (TDD) UL-DL configuration and a number of cells that have been actually set as the specific TDD UL-DL configuration within the received configuration. The method may comprise: receiving a signal for activating the one or the plurality of second cells from the first cell. Here, both the first cell and the second cells operate in TDD or the first cell and the second cells independently operate in TDD and Frequency Division Duplex (FDD).

In accordance with this specification, an uplink signal can be smoothly transmitted through an uplink channel by determining a maximum number of aggregatable cells in order to send an HARQ-ACK/NACK in a situation in which a plurality of cells is aggregated.

DESCRIPTION OF EXEMPLARY EMBODIMENTS

Figure 1:
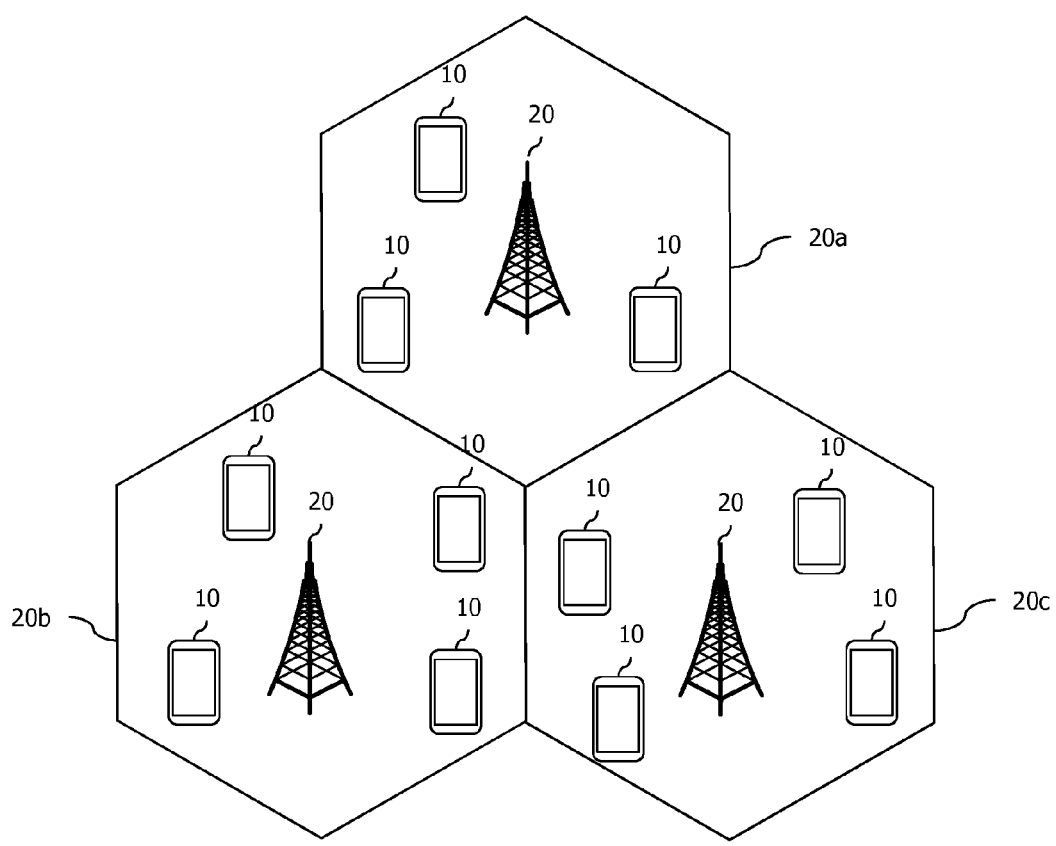
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 shows a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). User equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The terminal generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
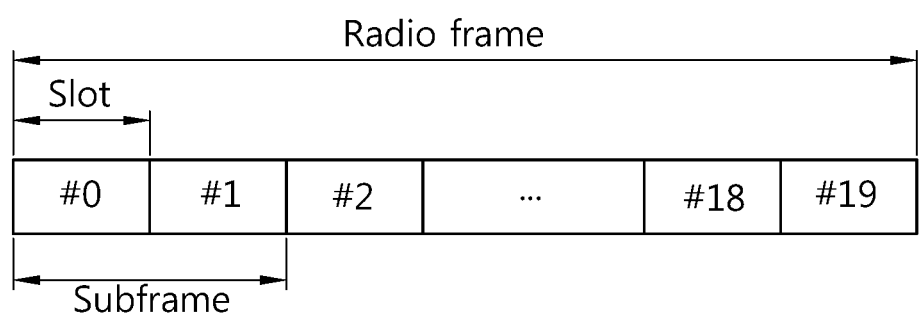
FIG. 2 illustrates the configuration of a radio frame according to FDD in 3GPP LTE.

FIG. 2 shows a downlink radio frame structure according to FDD of 3rd generation partnership project (3GPP) long term evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
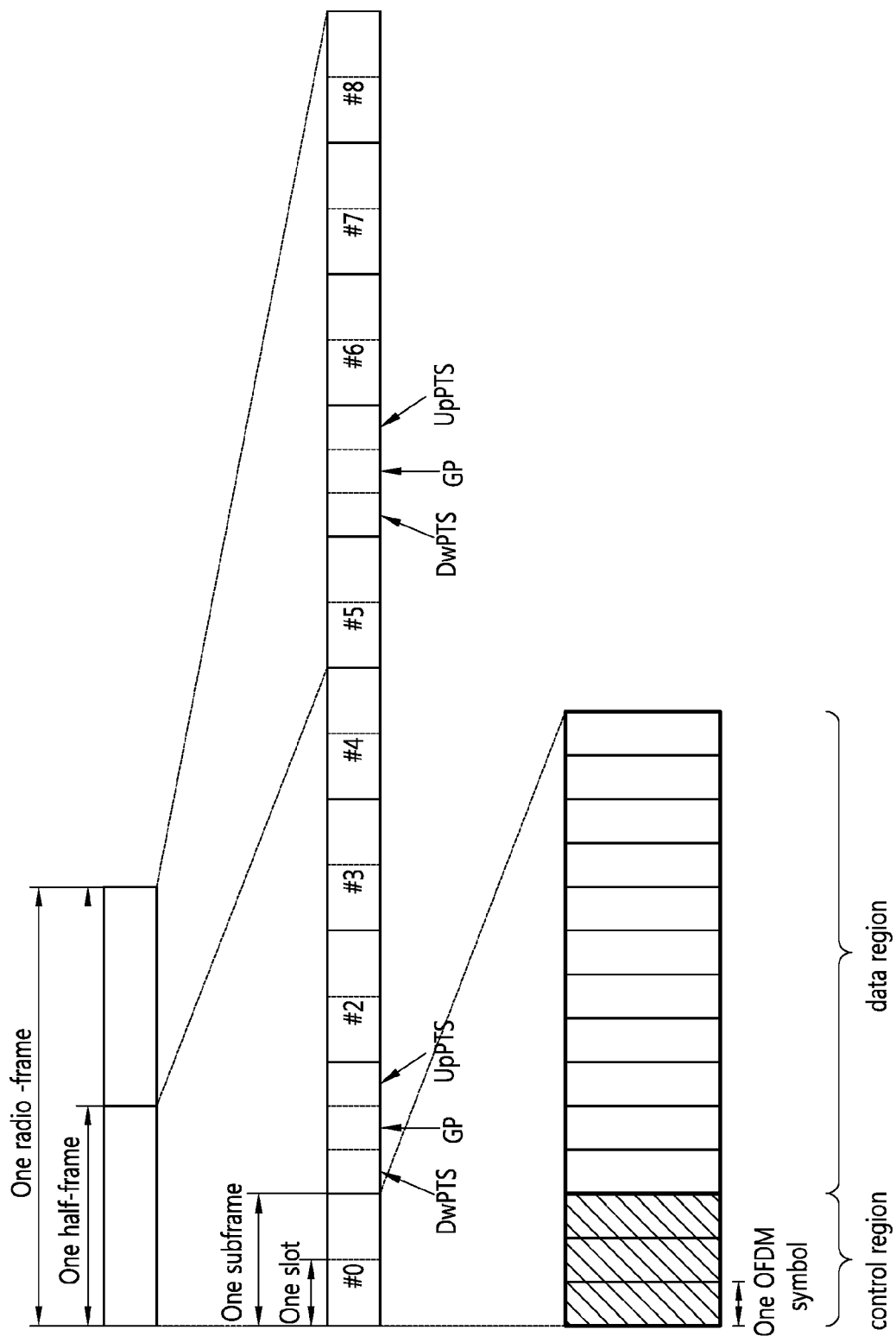
FIG. 3 illustrates the structure of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config-uraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
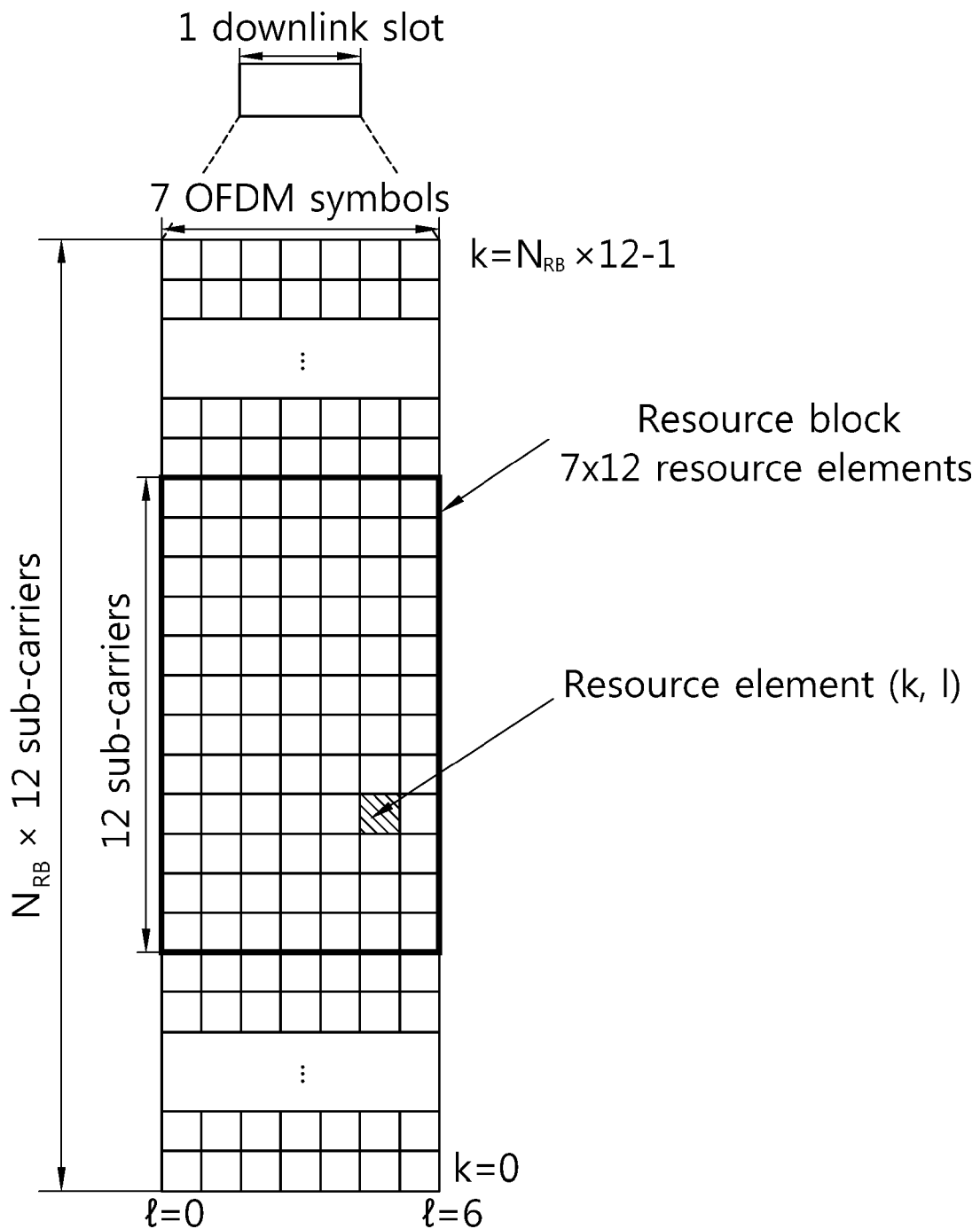
FIG. 4 is an exemplary diagram illustrating a resource grid for a single uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
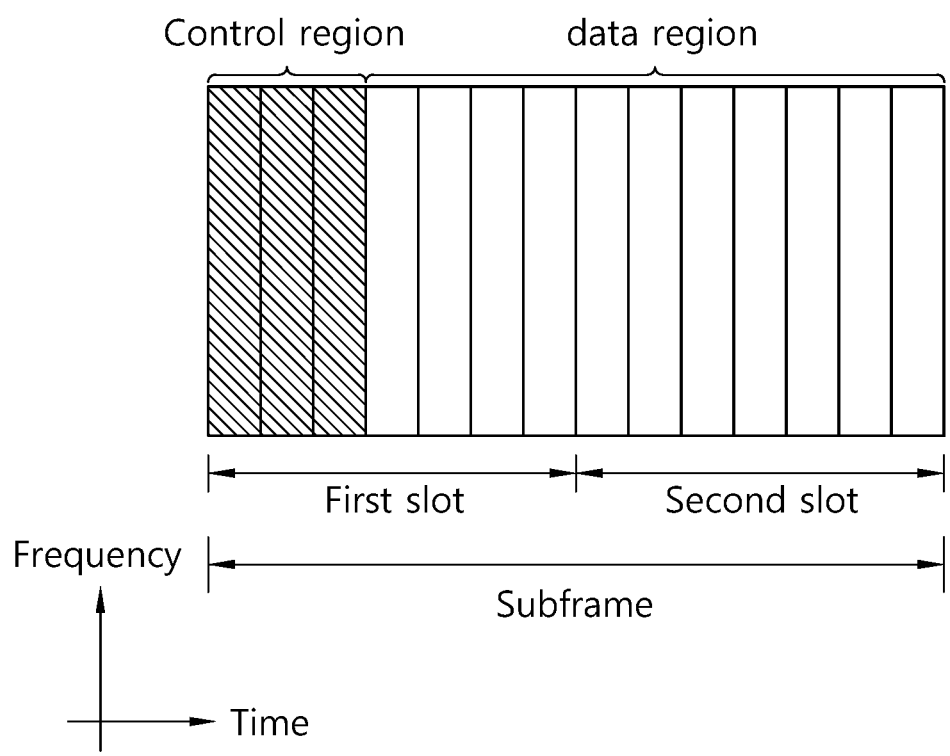
FIG. 5 illustrates the structure of a downlink subframe.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
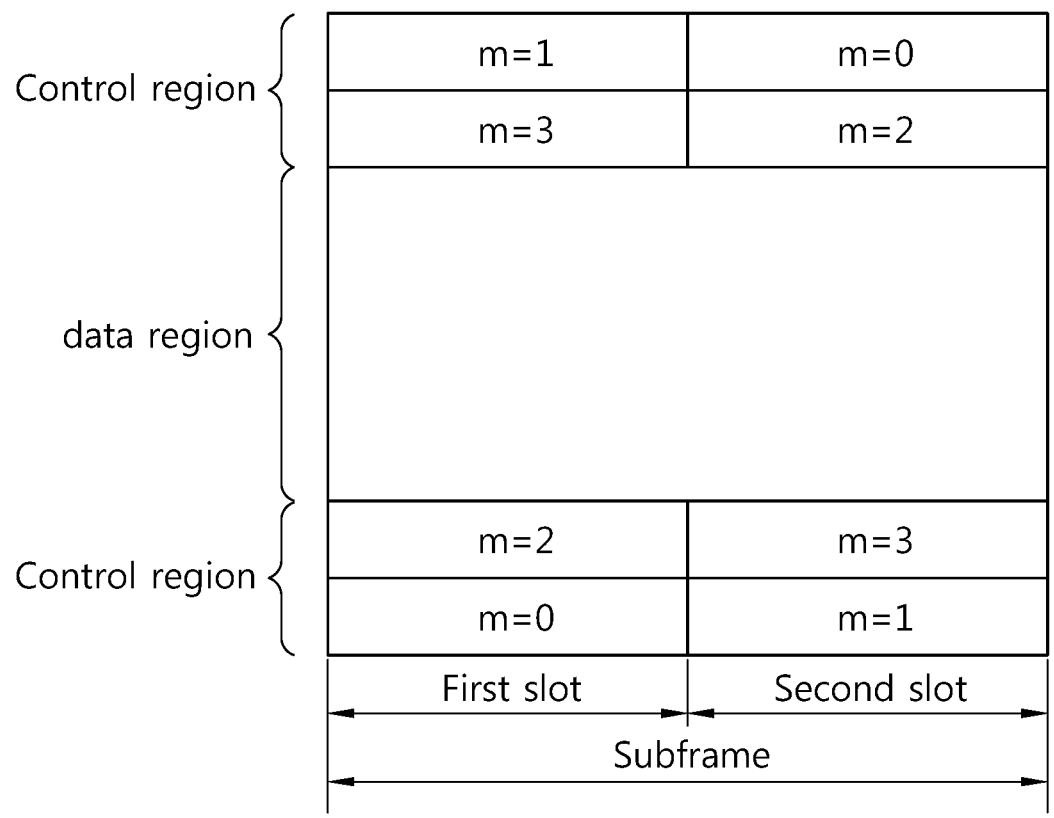
FIG. 6 illustrates the structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
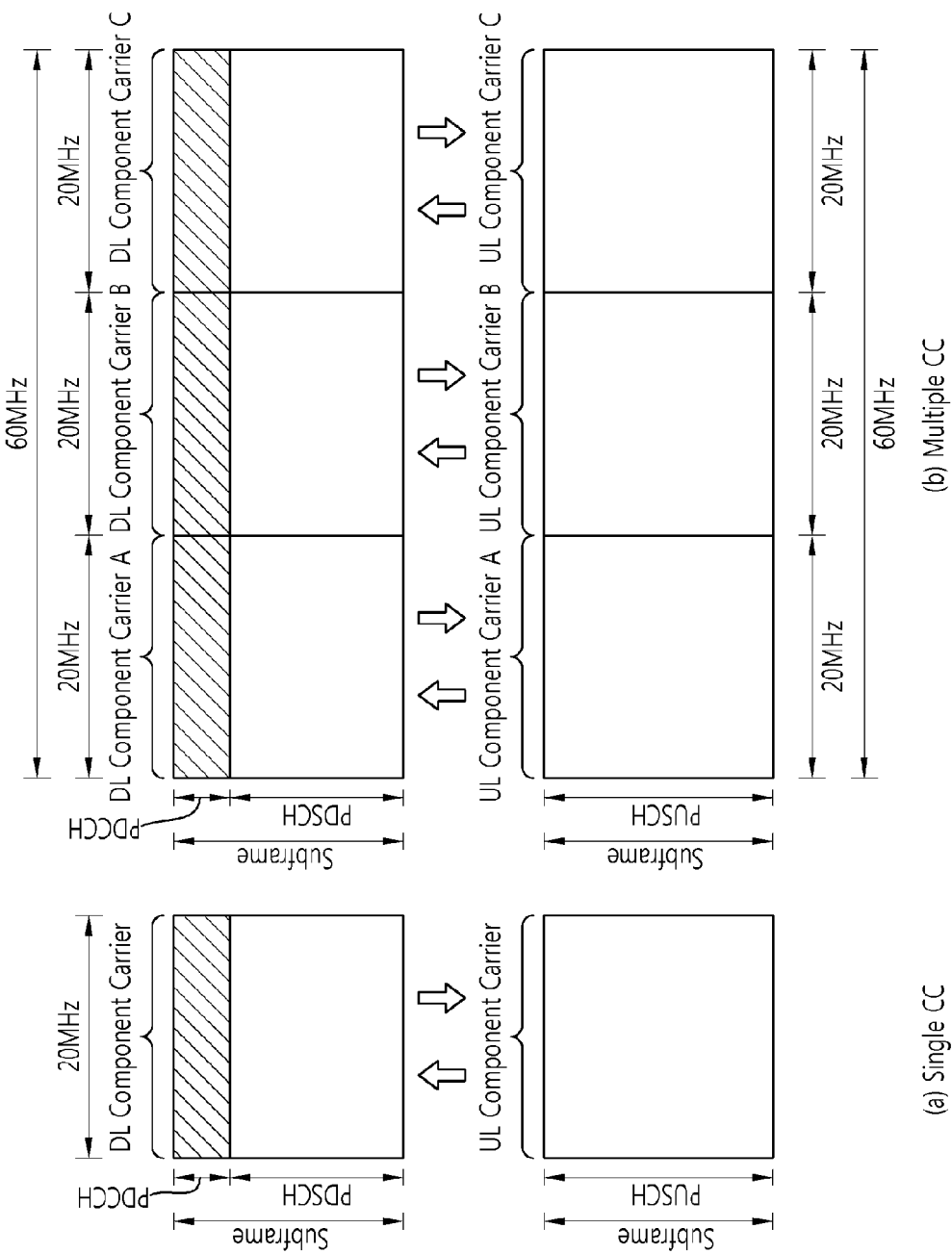
FIGS. 7(a) and (b) are examples of a comparison between an existing single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell 2 is configured by connection of DL CC2 and UL CC2, activation of serving cell 2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
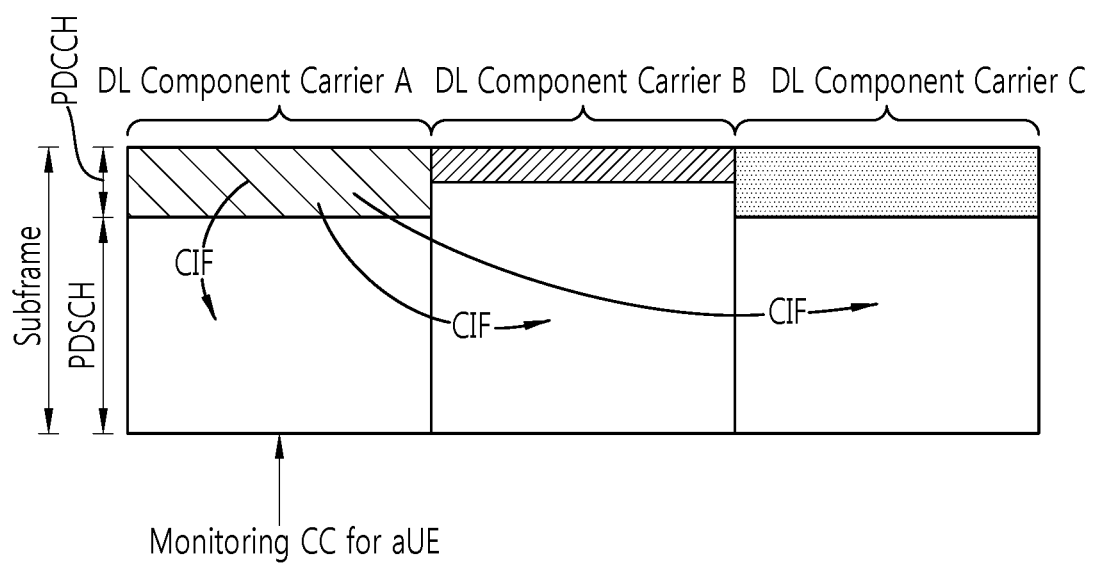
FIG. 8 illustrates cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
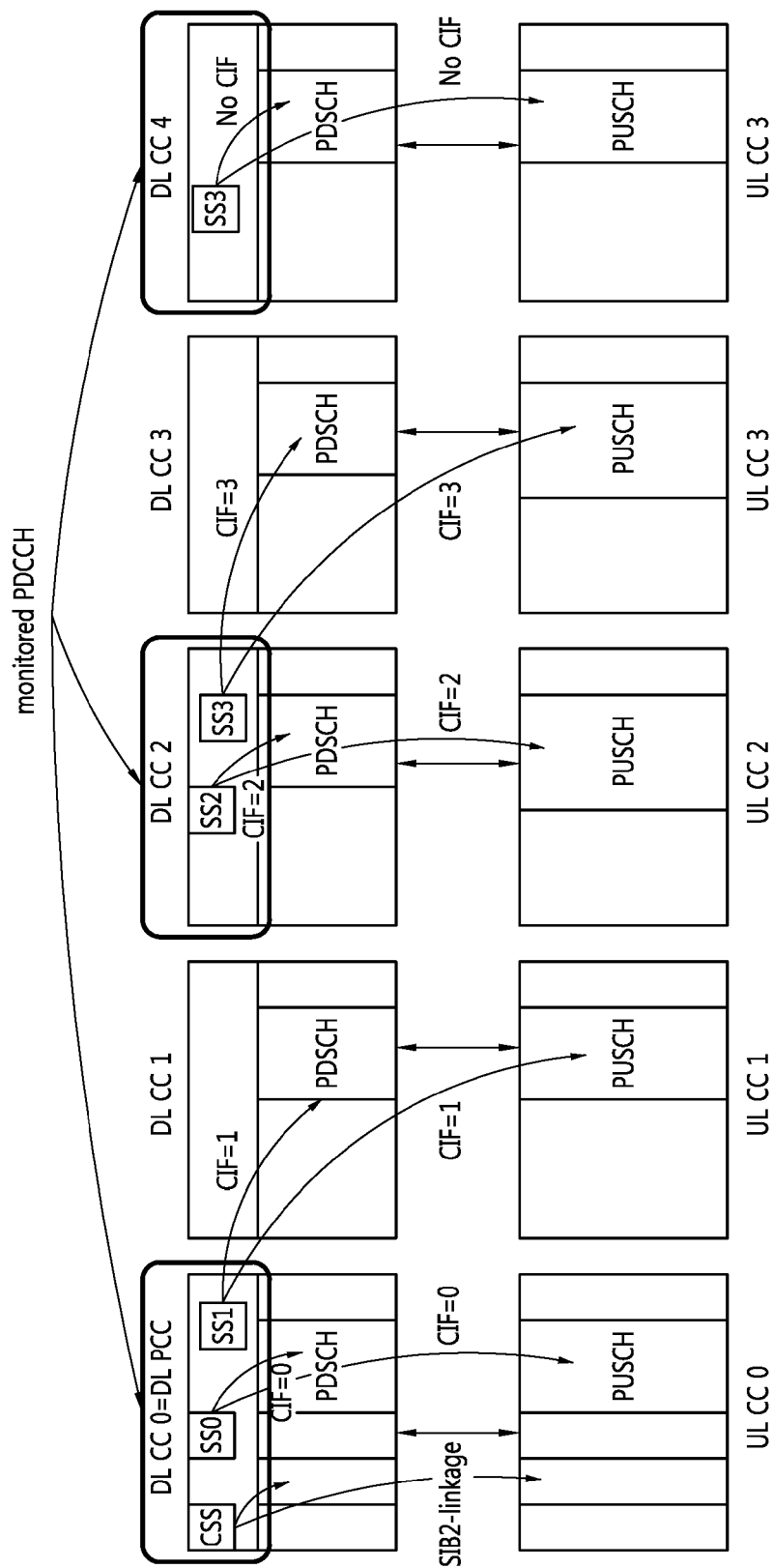
FIG. 9 illustrates an example of scheduling when cross-carrier scheduling is configured in a carrier aggregation system.

FIG. 9 illustrates an example of scheduling performed when cross-carrier scheduling is configured in a cross-carrier scheduling.

Referring to FIG. 9, DL CC 0, DL CC 2, and DL CC 4 belong to a PDCCH monitoring DL CC set. The user equipment searches for DL grants/UL grants for DL CC 0 and UL CC 0 (UL CC linked to DL CC 0 via SIB 2) in the CSS of DL CC 0. The user equipment searches for DL grants/UL grants for DL CC 1 and UL CC 1 in SS 1 of DL CC 0. SS 1 is an example of USS. That is, SS 1 of DL CC 0 is a space for searching for a DL grant/UL grant performing cross-carrier scheduling.

Figure 10:
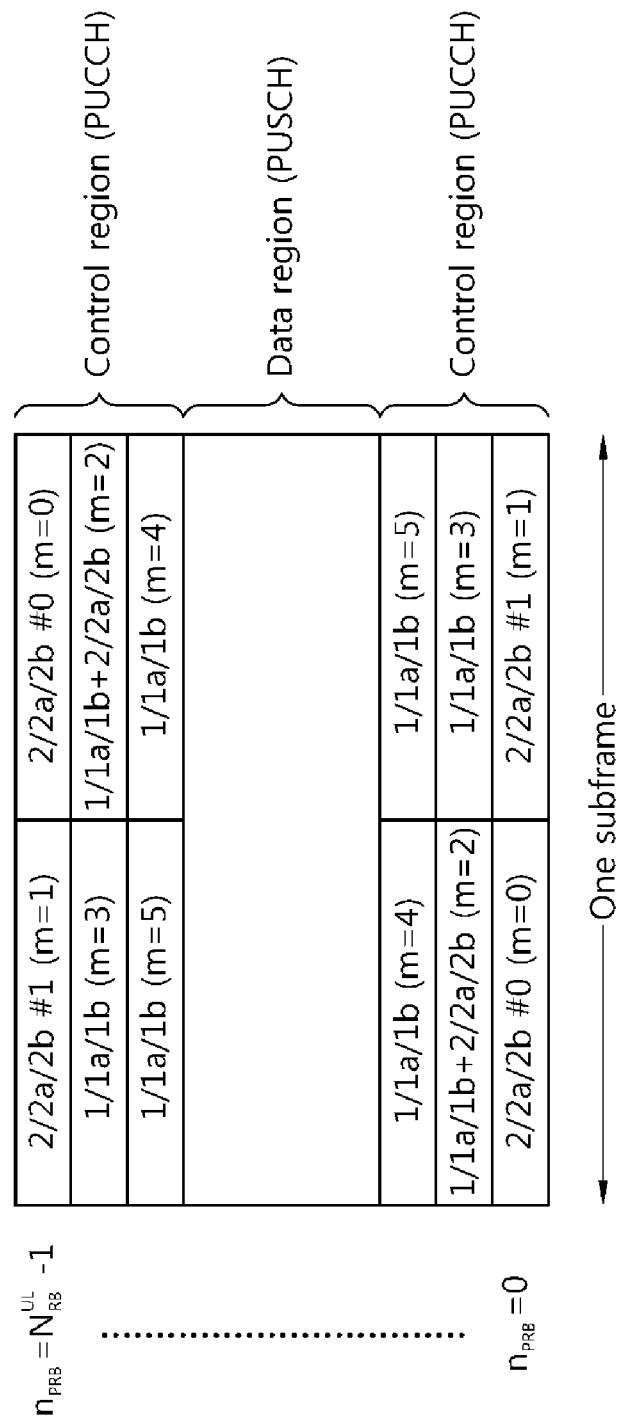
FIG. 10 illustrates PUCCHs and a PUSCH in an uplink subframe.

FIG. 10 illustrates a PUCCH and a PUSCH on an uplink subframe.

PUCCH formats will be described with reference to FIG. 10.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1a transmits an acknowledgement/non-acknowledgment (ACK/NACK) modulated by a binary phase shift keying (BPSK) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 2 illustrates the PUCCH formats.

TABLE 2

| Format | Description |
| --- | --- |
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number $N^{(2)}_{RB}$ of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel. Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

Hereinafter, the periodic transmission of CSI is described.

Figure 11A:
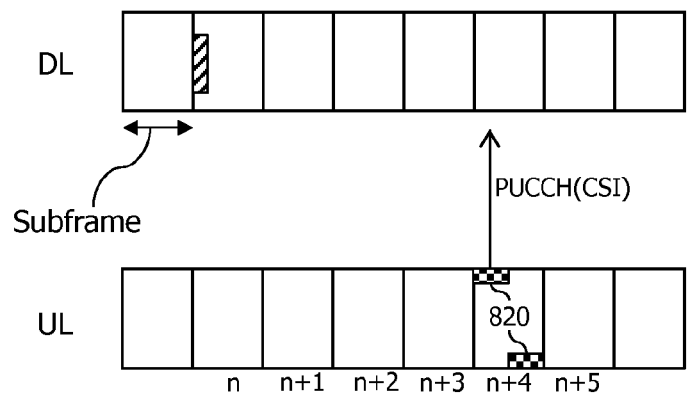
FIG. 11a illustrates an example of a periodic CSI report in 3GPP LTE.

FIG. 11a illustrates an example of a periodic CSI report in 3GPP LTE.

As shown in FIG. 11a, the CSI may be transmitted through the PUCCH periodically according to a period determined in the upper layer. That is, the periodic channel status information (CSI) may be transmitted through the PUCCH.

The UE may be semi-statically configured by an upper layer signal so as to periodically feed-back a differential CSI (CQI, PMI, RI) through the PUCCH. In this case, the UE transmits the corresponding CSI according to modes defined as shown in a table given below.

TABLE 3

| | | PMI feed-back time | |
|---|---|---|---|
| | | No PMI | Single PMI |
| PUCCH CQI feed-back type | Wideband CQI | Mode 1-0 | Mode 2-0 |
| | Selective subband CQI | Mode 2-0 | Mode 2-1 |

A periodic CSI reporting mode in the PUCCH described below is supported for each of the aforementioned transmission modes.

TABLE 4

| Transmission mode | PUCCH CSI reporting mode |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | When PMI/RI reporting is configured to UE in modes 1-1 and 2-1; When PMI/RI reporting is not configured to UE in modes 1-0 and 2-0 |
| transmission mode 9 | When PMI/RI reporting is configured to UE in modes 1-1 and 2-1 and the number of CSI-RS ports is larger than 1. When PMI/RI reporting is not configured to UE in modes 1-0 and 2-0 or the number of CSI-RS ports is 1 |

Meanwhile, a collision of the CSI report means a case in which a subframe configured to transmit a first CSI and a subframe configured to transmit a second CSI are the same as each other. When the collision of the CSI report occurs, the first CSI and the second CSI are simultaneously transmitted, or the transmission of a CSI having a low priority is discarded (alternatively, referred to as abandon or drop), and a CSI having a high priority may be transmitted, according to priorities of the first CSI and the second CSI.

The CSI report through the PUCCH may include various report types according to a transmission combination of the CQI, the PMI, and the RI, and a period and an offset value divided according to each report type (hereinafter, abbreviated as a type) are supported.

Type 1: Supports CQI feedback for a subband selected by the UE.

Type 1a: Supports subband CQI and second PMI feedback.

Types 2, 2b, and 2c: Supports wideband CQI and PMI feedback.

Type 2a: Supports wideband PMI feedback.

Type 3: Supports RI feedback.

Type 4: Transmits the wideband CQI.

Type 5: Supports RI and wideband PMI feedback.

Type 6: Supports RI and PTI feedback.

Hereinafter, the aperiodic transmission of CSI is described.

Figure 11B:
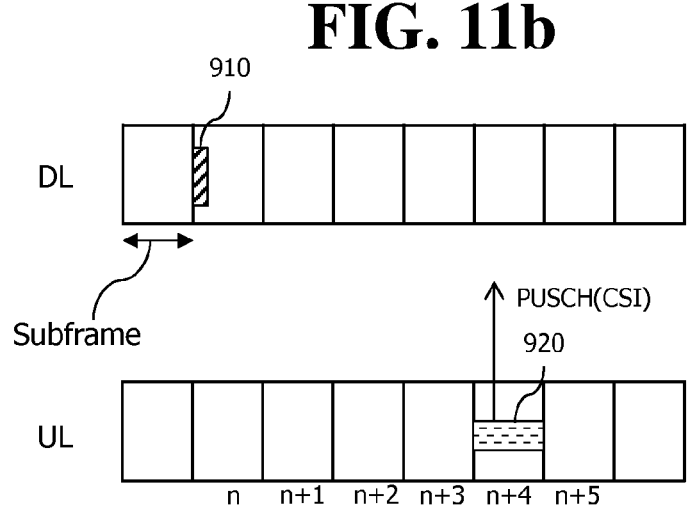
FIG. 11b illustrates an example of an aperiodic CSI report in 3GPP LTE.

FIG. 11b illustrates an example of an aperiodic CSI report in 3GPP LTE.

A control signal that requests the transmission of CSI, that is, an aperiodic CSI request signal, may be included in the scheduling control signal of a PUSCH transmitted in a PDCCH 910, that is, an UL grant. In this case, UE aperiodically reports CSI through a PUSCH 920. As described above, the transmission of CSI on a PUSCH is called an aperiodic CSI report in that it is triggered in response to a request from a BS. The CSI report may be triggered by an UL grant or a random access response grant.

More specifically, a wireless device receives an UL grant, including information about the scheduling of the PUSCH, through the PDCCH 910 in a subframe n. The UL grant may include a CQI request field. The following table illustrates an example of a CQI request field of 2 bits. The value or number of bits of the CQI request field is only an example.

TABLE 5

| Value of CQI request field | Contents |
|---|---|
| 00 | A CSI report is not triggered |
| 01 | A CSI report on a serving cell is triggered |
| 10 | A CSI report on a first set of serving cells is triggered |
| 11 | A CSI report on a second set of serving cells is triggered |

A BS may previously notify a wireless device of information about the first and the second sets whose CSI reports are triggered.

When a CSI report is triggered, the wireless device sends CSI on the PUSCH 920 in a subframe n+k. In this case, k=4, but is only an example.

A BS may previously designate report node for CSI to a wireless device.

The following table illustrates an example of CSI report modes in 3GPP LTE.

TABLE 6

| | PMI feedback type | | |
|---|---|---|---|
| | No PMI | Single PMI | Multiple PMI |
| Wideband CQI | | | Mode 1-2 |
| Selective subband CQI | Mode 2-0 | | Mode 2-2 |
| Set subband CQI | Mode 3-0 | Mode 3-1 | |

(1) Mode 1-2 (Mode 1-2)

A precoding matrix is selected on the assumption that DL data is transmitted only through a corresponding subband with respect to each subband. A wireless device generates a CQI (called a wideband CQI) by assuming the selected precoding matrix with respect to a band (called a band set S) designated by a system band or a high layer signal.

The wireless device sends CSI including the wideband CQI and the PMI of each subband. In this case, the size of each subband may be different depending on the size of a system band.

(2) Mode 2-0

A wireless device selects preferred M subbands with respect to a band (band set S) designated by a system band or a high layer signal. The wireless device generates a subband CQI by assuming that data has been transmitted in the selected M subbands. The wireless device additionally generates a single wideband CQI with respect to the system band or the band set S.

The wireless device sends CSI, including information about the selected M subbands, the subband CQI, and the wideband CQI.

(3) Mode 2-2

A wireless device selects M preferred subbands and a single precoding matrix for the M preferred subbands on the assumption that DL data is transmitted through the M preferred subbands.

Subband CSI for the M preferred subbands is defined in each codeword. In addition, the wireless device generates a wideband CQI for a system band or a band set S.

The wireless device sends CSI, including the M preferred subbands, a single subband CQI, and a PMI, wideband PMI, and wideband CQI for the M preferred subbands.

(4) Mode 3-0

A wireless device sends CSI, including a wideband CQI and a subband CQI for configured subbands.

(5) Mode 3-1

A wireless device generates a single precoding matrix for a system band or a band set S. The wireless device generates a subband CQI for each codeword by assuming the generated single precoding matrix. The wireless device may generate a wideband CQI by assuming the single precoding matrix.

The simultaneous transmission of a PUCCH and a PUSCH is described below.

In 3GPP Release 8 or Release 9 systems, UE is not allowed to simultaneously send a PUCCH and a PUSCH on a single carrier in order to maintain single carrier characteristics when using the SC-FDMA method for uplink transmission.

In 3GPP Release 10 systems, however, whether a PUCCH and a PUSCH are simultaneously transmitted may be indicated by a higher layer. That is, UE may simultaneously send a PUCCH and a PUSCH or may send only one of a PUCCH and a PUSCH in response to an instruction from a higher layer.

Figure 11C:
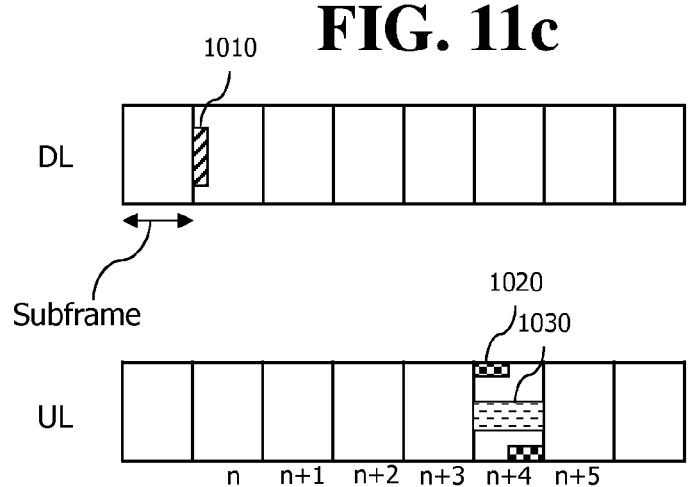
FIG. 11c illustrates an example of simultaneous transmission of PUCCHs and PUSCHs.

FIG. 11c illustrates an example of the simultaneous transmission of a PUCCH and a PUSCH.

As may be seen with reference to FIG. 11c, UE receives a PDCCH 1010 in a subframe n.

Furthermore, the UE may simultaneously send a PUCCH 1020 and a PUSCH 1030 in a subframe n+4, for example.

The simultaneous transmission of the PUCCH and the PUSCH is defined as follows in a 3GPP Release 10 system.

It is assumed that UE has been configured for only a single serving cell and configured to not simultaneously send a PUSCH and a PUCCH. In this case, if the UE does not send a PUSCH, UCI may be transmitted according to the PUCCH formats 1/1a/1b/3. If the UE sends a PUSCH, but the PUSCH does not correspond to a random access response grant, UCI may be transmitted through the PUSCH.

Unlike in the above, it is assumed that UE has been configured for only a single serving cell and configured to not simultaneously send a PUSCH and a PUCCH. In this case, if UCI includes only HARQ-ACK and an SR, UCI may be transmitted through a PUCCH according to the PUCCH formats 1/1a/1b/3. If UCI includes only periodic CSI, however, the UCI may be transmitted on a PUCCH according to the PUCCH format 2. Alternatively, if UCI includes periodic CSI and HARQ-ACK and the UE does not send a PUSCH, the UCI may be transmitted through a PUCCH according to the PUCCH formats 2/2a/2b. Alternatively, if UCI includes only HARQ-ACK/NACK or UCI includes HARQ-ACK/NACK and an SR, UCI includes an affirmative SR and periodic/aperiodic CSI, or UCI includes only aperiodic CSI, the HARQ-ACK/NACK, the SR, and the affirmative SR may be transmitted through a PUCCH, and the periodic/aperiodic CSI may be transmitted through a PUSCH.

Unlike in the above, it is assumed that UE has been configured for one or more serving cells and configured to not simultaneously send a PUSCH and a PUCCH. In this case, if the UE does not send a PUSCH, UCI may be transmitted through a PUCCH according to the PUCCH formats 1/1a/1b/3. If UCI includes aperiodic CSI or includes aperiodic UCI and HARQ-ACK, the UCI may be transmitted through the PUSCH of a serving cell. Alternatively, if UCI includes periodic CSI and HARQ-ACK/NACK and the UE does not send a PUSCH in the subframe n of a primary cell, the UCI may be transmitted through the PUSCH.

Unlike in the above, it is assumed that UE has been configured for one or more serving cells and configured to be able to simultaneously send a PUSCH and a PUCCH. In this case, if UCI includes one or more of HARQ-ACK and an SR, the UCI may be transmitted through a PUCCH according to the PUCCH formats 1/1a/1b/3. If UCI includes only periodic CSI, however, the UCI may be transmitted through a PUCCH using the PUCCH format 2. Alternatively, if UCI includes periodic CSI and HARQ-ACK/NACK and the UE does not send a PUSCH, CSI may be dropped (or abandoned) without being transmitted according to some conditions. Alternatively, if UCI is transmitted through HARQ-ACK/NACK and periodic CSI and the UE sends a PUSCH in the subframe of a primary cell, the HARQ-ACK/NACK may be transmitted through a PUCCH according to the PUCCH formats 1a/1b/3 and the periodic CSI may be transmitted through the PUSCH.

An HARQ in 3GPP LTE is described below.

3GPP LTE uses a synchronous HARQ in uplink transmission and uses an asynchronous HARQ in downlink transmission. The synchronous HARQ means that retransmission timing is fixed, and the asynchronous HARQ means that retransmission timing is not fixed. That is, the synchronous HARQ is initially transmitted and retransmitted in a cycle of an HARQ.

Figure 12:
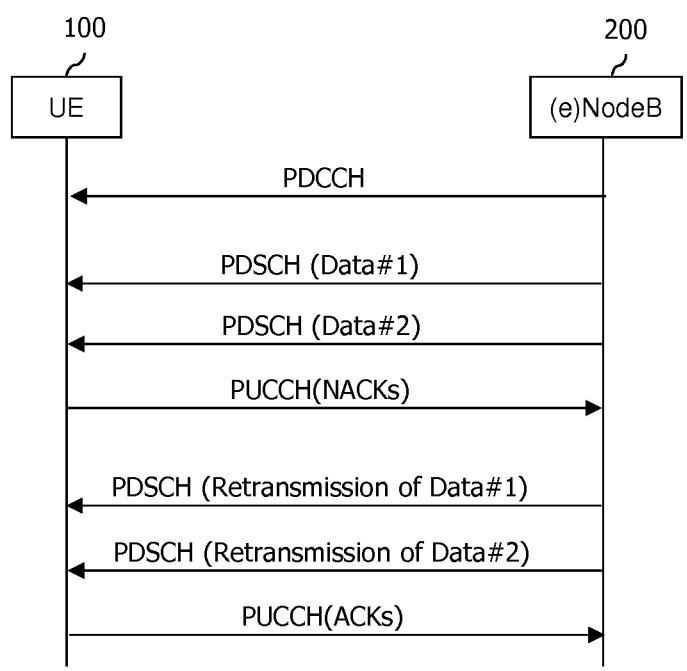
FIG. 12 is an exemplary diagram illustrating the operation of an HARQ between an eNodeB and UE.

FIG. 12 is an exemplary diagram illustrating the operation of an HARQ between an (e)NodeB and UE.

As illustrated in FIG. 12, in a prior art, an HARQ operation is performed in the MAC layer for efficient transmission of data, and a detailed HARQ operation process is as follows.

First, an (e)NodeB, that is, an eNodeB 200, sends scheduling information through a physical downlink control channel (PDCCH) in order to send data to UE, that is, UE 100, using an HARQ method.

The UE 100 checks incoming scheduling information by monitoring the control channel, that is, the PDCCH.

If information about the UE 100 is found to be present by checking the scheduling information, the UE 100 receives data (e.g., illustrated data#1 and data#2) from the eNodeB 200 through a common channel (a physical shared channel (PSCH)) at a point of time associated with the PDCCH.

When receiving the data, the UE 100 attempts the decoding of the data. The UE sends HARQ feedback to the eNodeB 200 based on a result of the decoding. That is, the UE 100 sends an ACK signal if it is successful in the decoding and sends an NACK signal to the eNodeB 200 through a PUCCH or PUSCH if it is unsuccessful in the decoding.

When receiving the ACK signal, the eNodeB 200 detects that the transmission of the data to the UE has been successful and sends next data.

If the eNodeB 200 receives the NACK signal, it detects that the transmission of the data to the UE 100 has been unsuccessful and retransmits the same data according to the same format or a new format at a proper point of time.

The UE 100 that has sent the NACK signal attempts the reception of the retransmitted data.

If the UE 100 receives the retransmitted data, it combines the retransmitted data and data stored in a buffer in the state in which the decoding of the data has been previously unsuccessful using various methods and attempts the decoding of the data. The UE 100 sends an ACK signal if it is successful in the decoding and sends an NACK signal to the eNodeB 200 through a PUCCH or PUSCH it is unsuccessful in the decoding. The UE 100 repeats a process of sending an NACK signal and receiving retransmitted data until it is successful in the decoding of data.

Meanwhile, in the existing 3GPP LTE release-10, a plurality of cells may be aggregated through a carrier aggregation. The number of bits of HARQ-ACK may be differently set depending on the state of the cells. In this case, the state of the cells may mean Transmission Mode (TM), the number of DL SFs corresponding to UL SFs, that is, the subject of transmission for a PUCCH in TDD, etc.

An aspect of the present invention is described below.

Figure 13:
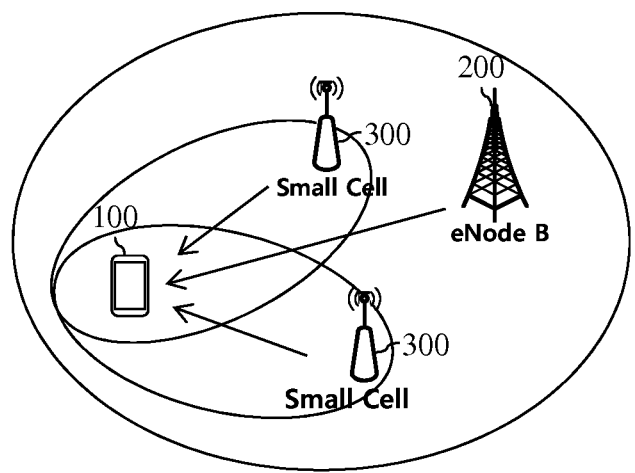
FIG. 13 is a diagram illustrating a heterogeneous network in which a macro cell and small cells having a possibility that they may become a next-generation wireless communication system are mixed.

FIG. 13 is a diagram illustrating a heterogeneous network in which a macro cell and small cells having a possibility that they may become a next-generation wireless communication system are mixed.

In a next-generation communication standard including 3GPP LTE-A, there is discussed a heterogeneous network in which small cells, for example, pico cells, femto cells, or micro cells having low-power transmission power are overlapped and present within existing macro cell coverage.

Referring to FIG. 13, a macro cell may overlap with one or more small cells. The service of the macro cell may be provided by a macro eNodeB 200. In this specification, a macro cell and a macro eNodeB may be interchangeably used. UE 100 that has accessed the macro cell may be called macro UE 100. The macro UE 100 receives a downlink signal from the macro eNodeB and sends an uplink signal to the macro eNodeB.

The small cell is also called a femto cell, a pico cell, or a micro cell. The small cell is provided by a small eNodeB 300, for example, a pico eNodeB, a home eNodeB (HeNB), a Relay Node (RN), etc. For convenience sake, a pico eNodeB, a home eNodeB (HeNB), a Relay Node (RN) is generally called an HeNB.

In such a heterogeneous network, the coverage gap of the macro cell can be filled by setting the macro cell as a PCell and setting the small cell as an SCell. Furthermore, overall performance can be boosted by setting the small cell as a PCell and setting the macro cell as an SCell.

Meanwhile, in a situation in which a macro cell and a small cell operate in TDD mode defined in 3GPP LTE/LTE-A, the macro cell may be set as a PCell, and the small cell may be set as an SCell.

In this case, in a next-generation system, a case where the UL-DL configurations illustrated in Table 1 are different may be permitted in the macro cell and the small cell. For example, the macro cell may operate according to the UL-DL configuration 4 illustrated in Table 1, and the small cell may operate according to the UL-DL configuration 5 illustrated in Table 1. In such a case, the number of bits of HARQ-ACK may be differently set in the macro cell and the small cell.

However, if cells having the UL-DL configuration 5, such as that illustrated in Table 1, are aggregated, in the existing Rel-10 system, a maximum number of the cells was limited to 2. The reason for this is that if the number of cells exceeds 2, all HARQ ACK/NACKs may not be sufficiently transmitted through the PUCCH format 3. More specifically, in the case of the UL-DL configuration 5, such as that illustrated in Table 1, the number of downlink subframes is 8, but the number of uplink subframes is only 1. Accordingly, HARQ ACK/NACK for data received on the 8 downlink subframes needs to be transmitted on the single uplink subframe. However, if the number of cells that are aggregated exceeds 2 and becomes 3 or more, time bundling is required because the single uplink subframe is not sufficient in sending HARQ ACK/NACK for data received from the 3 cells. As a result, in the case of TDD, the aggregation of cells may have been limited depending on an UL-DL configuration.

However, in a next-generation system, a macro cell and a small cell may permit a case where the UL-DL configurations illustrated in Table 1 are different, and a maximum number of cells that are aggregated need to be expanded and developed without being limited depending on a combination thereof.

Accordingly, if a reference configuration of aggregated cells is set as the UL-DL configuration 5, a criterion and scheme for determining the number of aggregatable cells is proposed below.

More specifically, in accordance with schemes proposed in this specification, with respect to aggregated cells, a maximum number of cells that are aggregated may be determined using i) the number of cells whose reference configuration is set as the UL-DL configuration 5 and ii) the number of cells, that is, the UL-DL configuration 5, as parameters.

Figure 14:
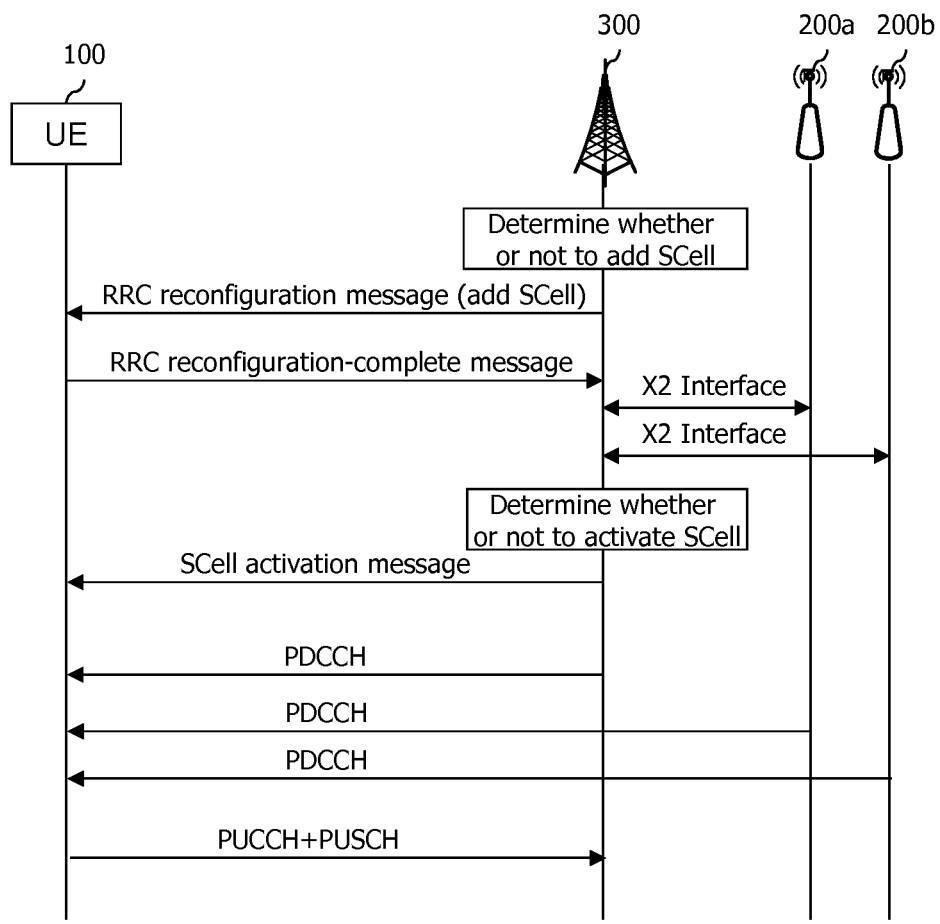
FIG. 14 is an exemplary diagram illustrating a scheme proposed in this specification.

FIG. 14 is an exemplary diagram illustrating a scheme proposed in this specification.

Referring to FIG. 14, a macro cell 300 is illustrated as being a PCell, and one or more small cells 200a, 200b are illustrated as being SCells. In this case, a primary cell, for example, the macro cell 300 and secondary cells (i.e., SCells), for example, the small cells 200a, 200b have been illustrated as having an inter-eNodeB form, but may have an intra-eNodeB form.

Meanwhile, a primary cell, for example, the macro cell 300 and secondary cells (i.e., SCells), for example, the small cells 200a, 200b may all operate in TDD. In this case, a primary cell, for example, the macro cell 300 may determine whether to add an SCell for the UE 100. In this case, if the UE 100 uses the PUCCH format 3 is used for the transmission of HARQ ACK/NACK with respect to data received from aggregated cells (i.e., the PCell and the SCells), detailed schemes are described in detail below.

As a first scheme, if the number of cells that belong to aggregatable cells and whose reference configuration has been set as the UL-DL configuration 5 is 2 and the number of cells that belong to the aggregatable cells and whose reference configuration has been actually set as the UL-DL configuration 5 is 2, the number of cells that belong to the aggregatable cells and that may be actually aggregated may be limited to 2. In contrast, if the number of cells that belong to aggregatable candidate cells and whose reference configuration has been set as the UL-DL configuration 5 is 1 and the number of cells that belong to the aggregatable candidate cells and whose reference configuration has been actually set as the UL-DL configuration 5 is 1, the number of cells that belong to the aggregatable candidate cells and that may be actually aggregated may be limited to 3. In other cases, the number of cells that belong to the aggregatable candidate cells and that may be actually aggregated is 5.

As a second scheme, if the number of cells that belong to aggregatable candidate cells and whose reference configuration has been set as the UL-DL configuration 5 is 2, the number of cells that may be actually aggregated may be limited to 2. If the number of cells that belong to aggregatable candidate cells and whose reference configuration has been set as the UL-DL configuration 5 is only 1 and the corresponding cell has not been actually set as the UL-DL configuration 5, the number of cells that belong to the aggregatable candidate cells and that may be actually aggregated may be limited to 4. In contrast, if the corresponding cell has been actually set as the UL-DL configuration 5, the number of cells that may be actually aggregated may be set to 3. In other cases, the number of cells that belong to the aggregatable candidate cells and that may be actually aggregated may be 5.

As a third scheme, if a total number of bits of HARQ-ACK may be set to 20 bits (or 21 bits) or less after spatial bundling with respect to aggregated cells, the aggregation of a plurality of cells is permitted. In this case, if the reference configuration of some cells is set as the UL-DL configuration 5 or actually set as the UL-DL configuration 5, two or more cells may be aggregated.

As a fourth scheme, a maximum number of aggregatable cells may be determined according to the number of cells whose reference configuration is set as the UL-DL configuration 5 through a high layer.

The reason why a maximum number of aggregatable cells in the above schemes is determined is that a maximum number of bits of HARQ-ACK that may be accommodated without performing time bundling is limited when a plurality of HARQ-ACKs is sent according to the PUCCH format 3.

When the added SCells are determined as described above, a primary cell, for example, the macro cell 300 sends an RRC reconfiguration message to UE, that is, the UE 100. One or more of the small cells 200a, 200b may be added as secondary cells (i.e., SCells) in response to the RRC reconfiguration message. In this case, the secondary cells may be for downlink. That is, the primary cell provides both uplink and downlink, but the secondary cell may provide only downlink.

The UE 100 sends an RRC reconfiguration-complete message to the primary cell 210 as a response to the RRC reconfiguration message.

The primary cell 300 determines whether or not to activate one or more of secondary cells (i.e., SCells), for example, the small cells 200a, 200b. If activation is required, the primary cell 300 sends an activation message to the UE 100.

Meanwhile, the aforementioned technical spirit may also be applied to a case where UL/DL may be flexibly changed as in eIMTA. Meanwhile, in the aforementioned schemes, the number of cells that are aggregated may be independently set through a high layer depending on the type (i.e. TDD, FDD, or eIMTA) of aggregated cells.

Meanwhile, both a primary cell, for example, the macro cell 300 and secondary cells (i.e., SCells), for example, the small cells 200a, 200b have been illustrated as operating in TDD, but the aforementioned technical spirit may also be applied to a case where any one cell operates in TDD and other cells operate in FDD. More specifically, if a PCell is FDD in a situation in which an FDD cell and a TDD cell are aggregated, HARQ-ACK bits for the TDD cell may be transmitted after 4 subframes subsequent to a subframe in which a PDSCH is received from the TDD cell. If a PCell is TDD, an SCell operating in FDD may be determined based on a specific TDD UL-DL configuration. In this case, the specific TDD UL-DL configuration, that is, the base, may correspond to any one of a reference configuration corresponding to currently aggregated cells and an actual UL-DL configuration. The above description may be expanded to a limit to the scheduling of cells operating in FDD if a PCell is FDD. A detailed example is as follows.

In a first example, a TDD UL-DL configuration is set with respect to cells operating in FDD through a high layer. The setting may be independently performed according to each of cells operating in FDD or may be identically performed for each cell group or for all the cells.

In a second example, a configuration that belongs to a reference configuration and an actual UL-DL configuration with respect to aggregated cells and that has a larger number of DL subframes is used as a base.

In a third example, a configuration that belongs to a reference configuration and an actual UL-DL configuration with respect to aggregated cells and that has a smaller number of DL subframes is used as a base.

Meanwhile, in a situation in which cells operating in FDD and cells operating in TDD are aggregated, whether or not to apply bundling and a method of applying bundling may be configured based on the same criterion as that of TDD even in the case of an FDD cell. For example, if HARQ-ACK is transmitted using the PUCCH format 3 and the number of bits of HARQ-ACK is greater than 20, spatial bundling may be identically performed on both cells operating in FDD and cells operating in TDD.

The embodiments of the present invention described so far may be implemented through various means. For example, the embodiments of the present invention may be implemented by hardware, firmware, software, or a combination of them. This is described below in detail with reference to a figure.

Figure 15:
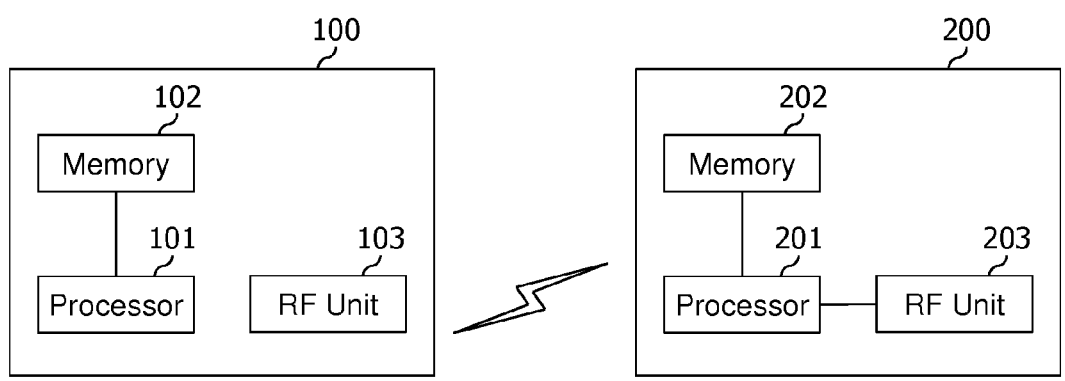
FIG. 15 is a block diagram illustrating a wireless communication system in which an embodiment of the present invention is implemented.

FIG. 15 is a block diagram illustrating a wireless communication system in which an embodiment of the present invention is implemented.

A macro eNodeB 200 includes a processor 201, memory 202, and a Radio Frequency (RF) unit 203. The memory 202 is connected to the processor 201, and stores various pieces of information for driving the processor 201. The RF unit 203 is connected to the processor 201, and sends and/or receives radio signals. The processor 201 implements the proposed functions, processes and/or methods. In the aforementioned embodiments, the operation of the eNodeB may be implemented by the processor 201.

UE 100 includes a processor 101, memory 102, and a Radio Frequency (RF) unit 103. The memory 102 is connected to the processor 101, and stores various pieces of information for driving the processor 101. The RF unit 103 is connected to the processor 101, and sends and/or receives radio signals. The processor 101 implements the proposed functions, processes and/or methods. In the aforementioned embodiments, the operation of the UE may be implemented by the processor 101.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing radio signals. When the aforementioned embodiment is implemented in software, the aforementioned scheme may be implemented as a module (process or function) configured to perform the above function. The module may be stored in the memory and executed by the processor. The memory may be placed inside or outside the processor and connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method for aggregating a plurality of cells, the method comprising:
    determining, by a first cell, whether or not to add one or a plurality of second cells for user equipment, wherein a maximum number of cells are determined depending on a number of cells that belong to the first cell and the one or the plurality of second cells and whose reference configuration has been set as a specific Time Division Duplex (TDD) UL-DL configuration and a number of cells that have been actually set as the specific TDD UL-DL configuration,
    transmitting, by the first cell, a configuration for adding one or a plurality of second cells to the user equipment based on the determined maximum number of cells; and
    transmitting, by the first cell, a signal for activating the one or the plurality of second cells to the user equipment,
    wherein both the first cell and the second cells operate in TDD or the first cell and the second cells independently operate in TDD and Frequency Division Duplex (FDD).

2. The method of claim 1, wherein in the specific TDD UL-DL configuration, a number of downlink subframes is a maximum and a number of uplink subframes is a minimum within a radio frame.

3. The method of claim 1, wherein the specific TDD UL-DL configuration is an UL-DL configuration 5 defined in 3GPP LTE or LTE-A.

4. The method of claim 1, wherein if the user equipment is configured as a PUCCH format 3, the determined maximum number of cells are aggregated.

5. The method of claim 1, wherein if a total number of HARQ ACK-NACK to be transmitted to the first cell and the added one or plurality of second cells is 20 bits or 21 bits or less, the one or the plurality of second cells is determined to be added.

6. The method of claim 5, wherein if a total number of HARQ ACK-NACK is 20 bits or 21 bits or less after spatial bundling is applied to HARQ ACK-NACK to be transmitted to the first cell and the added one or plurality of second cells, the one or the plurality of second cells is determined to be added.

7. A base station for providing a first cell for user equipment, comprising:
    a processor configured to determine whether or not to add one or a plurality of second cells for the user equipment, wherein a maximum number of cells are determined depending on a number of cells that belong to the first cell and the one or the plurality of second cells and whose reference configuration has been set as a specific Time Division Duplex (TDD) UL-DL configuration and a number of cells that have been actually set as the specific TDD UL-DL configuration; and
    a transmission/reception unit configured to transit a configuration for adding one or a plurality of second cells to the user equipment based on the determined maximum number of cells and transmit a signal for activating the one or the plurality of second cells to the user equipment, wherein both the first cell and the second cells operate in TDD or the first cell and the second cells independently operate in TDD and Frequency Division Duplex (FDD).

8. The base station of claim 7, wherein in the specific TDD UL-DL configuration, a number of downlink subframes is a maximum and a number of uplink subframes is a minimum within a radio frame.

9. The base station of claim 7, wherein if the user equipment is configured as a PUCCH format 3, the determined maximum number of cells are aggregated.

10. The base station of claim 7, wherein if a total number of HARQ ACK-NACK to be transmitted to the first cell and the added one or plurality of second cells is 20 bits or 21 bits or less, the one or the plurality of second cells is determined to be added.

11. A method for supporting an aggregation of a plurality of cells in user equipment, the method comprising:
receiving a configuration for adding one or a plurality of second cells from a first cell, wherein the one second cell or a number of the plurality of second cells is determined depending on a number of cells that belong to the first cell and the one or the plurality of second cells and whose reference configuration has been set as a specific Time Division Duplex (TDD) UL-DL configuration and a number of cells that have been actually set as the specific TDD UL-DL configuration within the received configuration; and
receiving a signal for activating the one or the plurality of second cells from the first cell,
wherein both the first cell and the second cells operate in TDD or the first cell and the second cells independently operate in TDD and Frequency Division Duplex (FDD).

12. The method of claim 11, wherein in the specific TDD UL-DL configuration, a number of downlink subframes is a maximum and a number of uplink subframes is a minimum within a radio frame.

13. The method of claim 11, wherein if a total number of HARQ ACK-NACK is 20 bits or 21 bits or less after spatial bundling is applied to HARQ ACK-NACK to be transmitted to the first cell and the added one or plurality of second cells, the one or the plurality of second cells is determined to be added.

* * * * *